(12) United States Patent
Cloutier

(10) Patent No.: US 9,161,377 B2
(45) Date of Patent: *Oct. 13, 2015

(54) INTEGRATING A MOBILE HOTSPOT INTO A LARGER NETWORK ENVIRONMENT

(71) Applicant: Bright House Networks, LLC, East Syracuse, NY (US)

(72) Inventor: Leo Cloutier, Falls Church, VA (US)

(73) Assignee: Bright House Networks, LLC, East Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/677,363

(22) Filed: Apr. 2, 2015

(65) Prior Publication Data

US 2015/0215974 A1   Jul. 30, 2015

Related U.S. Application Data

(63) Continuation of application No. 14/070,849, filed on Nov. 4, 2013, now Pat. No. 9,002,319, which is a continuation of application No. 13/469,153, filed on May 11, 2012, now Pat. No. 8,600,344.

(60) Provisional application No. 61/599,081, filed on Feb. 15, 2012.

(51) Int. Cl.
*H04M 11/00* (2006.01)
*H04W 76/02* (2009.01)
(Continued)

(52) U.S. Cl.
CPC .............. *H04W 76/02* (2013.01); *H04M 15/58* (2013.01); *H04W 4/24* (2013.01); *H04W 12/08* (2013.01); *H04W 48/16* (2013.01); *H04W 84/105* (2013.01)

(58) Field of Classification Search
CPC ....... H04W 76/02; H04W 12/08; H04W 4/24; H04W 48/16; H04W 84/105; H04W 12/06; H04W 84/12; H04M 15/58; H04M 15/8055; H04M 15/8061; H04M 15/93
USPC ............. 455/405, 411, 41.2, 436, 445, 552.1, 455/422.1; 370/352, 338; 709/217, 224, 709/225
See application file for complete search history.

(56) References Cited

U.S. PATENT DOCUMENTS 6,795,700 B2 * 9/2004 Karaoguz et al. ............. 455/408
6,950,628 B1 * 9/2005 Meier et al. .................. 455/41.2
(Continued)

OTHER PUBLICATIONS

Author Unknown, "Mobile in a Minute," Personal Area Networks, Copyright: 2004, 2 pages, http://www.MobileIN.com.
(Continued)

*Primary Examiner* — Mahendra Patel
(74) *Attorney, Agent, or Firm* — Withrow & Terranova, PLLC

(57) ABSTRACT

Integration of a mobile hotspot into a service provider network is disclosed. A network node establishes a first wireless communication link with a mobile hotspot device. The mobile hotspot device is configured to establish a second wireless communications link with at least one client device. The network node receives an access request message from the mobile hotspot device which comprises credentials provided by the at least one client device. The network node determines that the at least one client device is authorized to access the service provider network through the mobile hotspot device based on the credentials and indicates to the mobile hotspot device that the at least one client device is authorized to access the service provider network through the mobile hotspot device.

17 Claims, 10 Drawing Sheets

(51) Int. Cl.
- *H04W 12/08* (2009.01)
- *H04W 4/24* (2009.01)
- *H04M 15/00* (2006.01)
- *H04W 48/16* (2009.01)
- *H04W 84/10* (2009.01)

(56) References Cited

U.S. PATENT DOCUMENTS

| | | | |
|---|---|---|---|
| 8,600,344 | B2 | 12/2013 | Cloutier |
| 9,002,319 | B2 | 4/2015 | Cloutier |
| 2003/0069787 | A1* | 4/2003 | Tendon et al. ............ 705/14 |
| 2006/0236378 | A1 | 10/2006 | Burshan |
| 2006/0271552 | A1* | 11/2006 | McChesney et al. ........ 707/10 |
| 2007/0165668 | A1 | 7/2007 | Liu |
| 2009/0017789 | A1* | 1/2009 | Thomas et al. ............ 455/406 |
| 2009/0149205 | A1 | 6/2009 | Heredia et al. |
| 2010/0184377 | A1* | 7/2010 | Zilliacus et al. ........... 455/41.2 |
| 2011/0182263 | A1* | 7/2011 | Varsavsky Waisman-Diamond ...... 370/329 |
| 2011/0276442 | A1* | 11/2011 | Momtahan et al. ......... 705/30 |
| 2011/0320607 | A1 | 12/2011 | Harrang et al. |
| 2012/0149309 | A1* | 6/2012 | Hubner et al. ............ 455/67.11 |
| 2013/0210379 | A1 | 8/2013 | Cloutier |
| 2014/0057593 | A1 | 2/2014 | Cloutier |

OTHER PUBLICATIONS

Author Unknown, "Wireless Access Point," Wikipedia—The Free Encyclopedia, Sep. 21, 2011, 4 pages, http://en.wikipedia.org/wiki/Wireless_access_point.

Sullivan, Mark et al., "Mobile Hotspots: Which are Fastest, Most Reliable?," PCWorld, Oct. 19, 2010, 3 pages, http://www.pcworld.com/article/208154/mobile_hotspots_which_are_fastest_most_reliable?.

Author Unknown, "Tethering," Wikipedia—The Free Encyclopedia, Sep. 11, 2011, 2 pages, http://en.wikipedia.org/wiki/Tethering.

Author Unknown, "Hotspot (Wi-Fi)," Wikipedia—The Free Encyclopedia, Jun. 6, 2011, 7 pages, http://en.wikipedia.org/wiki/Hotspot_(Wi-Fi).

Author Unknown, "Wireless Network," Wikipedia—The Free Encyclopedia, May 6, 2011, 6 pages, http://en.wikipedia.org/wiki/Wireless_network.

Non-Final Office Action for U.S. Appl. No. 13/469,153, mailed May 21, 2013, 25 pages.

Notice of Allowance for U.S. Appl. No. 13/469,153, mailed Sep. 16, 2013, 17 pages.

Notice of Allowance and Examiner-Initiated Interview Summary for U.S. Appl. No. 14/070,849, mailed Nov. 28, 2014, 18 pages.

\* cited by examiner

INTEGRATING A MOBILE HOTSPOT INTO A LARGER NETWORK ENVIRONMENT

RELATED APPLICATIONS

This application is a continuation of U.S. patent application Ser. No. 14/070,849, filed Nov. 4, 2013, entitled "INTEGRATING A MOBILE HOTSPOT INTO A LARGER NETWORK ENVIRONMENT," which is a continuation of U.S. patent application Ser. No. 13/469,153, filed May 11, 2012, now U.S. Pat. No. 8,600,344, issued Dec. 3, 2012, entitled "INTEGRATING A MOBILE HOTSPOT INTO A LARGER NETWORK ENVIRONMENT," which claims the benefit of Provisional Patent Application No. 61/599,081, filed Feb. 15, 2012, entitled "INTEGRATING A MOBILE HOTSPOT INTO A LARGER NETWORK ENVIRONMENT," each of which is hereby incorporated herein by reference in its entirety.

TECHNICAL FIELD

The present disclosure relates generally to wireless access of a network, and in particular to the integration of a mobile hotspot device into a larger network environment.

BACKGROUND

New "4G" cellular data technologies such as WiMax and LTE make high-bandwidth applications, such as streaming video applications, possible. Such applications have driven the demand for data by consumers. Wireless service providers are making significant investments in their infrastructure to meet this demand. Because wireless subscription fees are extremely competitive, service differentiators are increasingly important to maintain existing subscribers and attract new ones. Moreover, data usage instead of voice communications is driving revenue for service providers, so service providers are incented to find ways to increase demand for data by its subscribers.

Many mobile devices today include a wireless interface such as a Wi-Fi interface that allows the mobile device to connect to a wireless local area network and access the Internet. Some of these mobile devices, such as cellular phone mobile devices, also include a cellular interface that allows the mobile device to access the Internet via a cellular communication link even when not in the presence of a wireless local area network, such as when in a vehicle. Such devices increasingly also have hotspot functionality that allows the mobile device to serve as a mobile hotspot, such that other Wi-Fi capable devices, referred to herein as client devices, may connect to the mobile device via the Wi-Fi interface, and access the Internet via the mobile device's cellular communication link. In this role the mobile device serves essentially as a wireless access point and router for client devices that would not otherwise have access to the Internet.

A service provider creates a potential new portal to their network each time one of their subscribers' devices with hotspot functionality is within wireless range of the service provider network. Since cellular phones increasingly have such functionality, it would be beneficial if a service provider could leverage its subscribers' devices to offer Internet access (and facilitate corresponding data usage) to other devices that are in Wi-Fi proximity of the cellular device, in a manner that benefits the service provider, as well as its subscribers.

SUMMARY

The present disclosure discloses mechanisms for facilitating access to a service provider network by integrating mobile subscriber devices into the service provider network, and thereby extending the reach of the service provider network to any location that a subscriber's device is enabled. In one embodiment, the subscriber's device, sometimes referred to herein as a mobile hotspot device (MHD), may be configured, or provisioned, automatically by the service provider with a wireless local area network (LAN) having a predetermined name, such as a predetermined service set identifier (SSID). The MHD may periodically broadcast the SSID to any other devices, sometimes referred to herein as client devices, which may be in wireless range of the MHD. Certain client devices may be programmed to detect the predetermined SSID, and in response, attempt to establish communication with the service provider network via the MHD.

In one embodiment, the client device may communicate credentials to the MHD. The MHD generates an access request message that includes the credentials, and sends the access request message to the service provider network for authentication. A network node in the service provider network receives the access request message, determines that the client device is authorized to access the service provider network through the MHD based on the credentials, and indicates to the MHD that the client device is so authorized.

In one embodiment, authorization may in part be based on whether a user of the client device has a subscription to access the service provider network. For example, the client device may comprise a cellular phone that receives service via the service provider network in accordance with the subscription with the service provider. The client device may have Wi-Fi capability, but not cellular data capability. The client device may include a client application that detects broadcasted SSIDs, and upon detecting an SSID that is the predetermined SSID, such as the hotspot offered by the MHD, recognize the hotspot as a service provider wireless LAN, and initiate the authorization sequence mentioned above automatically. Once authorized, the user of the client device enjoys Internet access that may not otherwise be obtainable at that particular location. In another embodiment, the client device may comprise a Wi-Fi capable laptop computer or tablet computer of a subscriber of the service provider. The client device includes the client application as well as suitable credentials that identify the device as being associated with the subscriber.

In one embodiment, the MHD is a cellular phone that enjoys access to the service provider network by virtue of a subscription between an owner of the MHD and the service provider. The MHD may concurrently provide both voice service to the owner, as well as mobile hotspot functionality such as data communications between the Internet and one or more client devices. Data usage by each client device may be counted against the subscription associated with the respective client device, rather than the MHD, so that the owner of the MHD is not penalized for providing access to the service provider network. Data usage by client devices that are associated with the subscription of the MHD, such as family members' client devices, may be counted against the subscription of the MHD. In one embodiment, the network node may determine that a client device has exceeded an allotment, such as a monthly allotment, associated with the client device subscription, and de-authorize access by the client device to the service provider network.

Prioritization of requests for data may be based on the client device to which the data is destined. In particular, data requested by the MHD may enjoy a higher priority than data requested by a client device. In this manner, the owner of the MHD is not penalized for allowing the MHD to be used as a mobile hotspot. For example, if the owner of the MHD initiates a first request for a first streaming movie from an Internet movie service, and a user of a client device similarly initiates a second request for a second streaming movie from an Internet movie service, sufficient bandwidth may be reserved for the first streaming movie so that the first streaming movie is provided at a relatively high resolution. Remaining bandwidth may be insufficient to provide the second streaming movie, or may require that a lower resolution version be provided to the client device. Such prioritization mechanisms may be implemented by the network node, the MHD, or a combination of both.

In one embodiment, upon receipt of a connection request by a client device, the MHD may access configuration data maintained on the MHD that identifies permitted client devices. For example, the owner of the MHD may identify family members' and particular associates', friends' or colleagues' client devices as being permitted client devices. If the client device is not identified in the configuration data as a permitted client device, the MHD does not generate and send an access request message with the client device's credentials to the network node, effectively barring access to the service provider network by the client device.

In one embodiment, the owner of the MHD may be compensated by the service provider for allowing the MHD to be used as a portal to the service provider network. For example, the service provider may reduce a portion of the monthly subscription fee of the owner based on the quantity of data that travels through the MHD on a path to a client device. Alternatively or additionally, the service provider may increase a data usage allotment associated with the MHD such that the MHD enjoys a larger data usage allotment based on the quantity of data that travels through the MHD on a path to a client device. Those of skill in the art will recognize that other compensation mechanisms are possible.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure discloses mechanisms for facilitating access to a service provider network by integrating mobile subscriber devices into the service provider network, and thereby extending the reach of the service provider network to any location that a subscriber's device is enabled. In one embodiment, the subscriber's device, sometimes referred to herein as a mobile hotspot device (MHD), may be configured, or provisioned, automatically by the service provider with a wireless local area network (WLAN) having a predetermined name, such as a predetermined service set identifier (SSID). In one embodiment, the MHD periodically broadcasts the SSID to any other devices, sometimes referred to herein as client devices, which may be in wireless range of the MHD. Certain client devices may be programmed to detect the predetermined SSID, and in response, attempt to establish communication with the service provider network via the MHD.

In another embodiment, rather than have an MHD broadcast its SSID, a client device may be preconfigured with the SSIDs of one or more MHDs, and may periodically check to determine if it is within range of such an MHD by attempting to connect to such preconfigured SSIDs.

Figure 1:
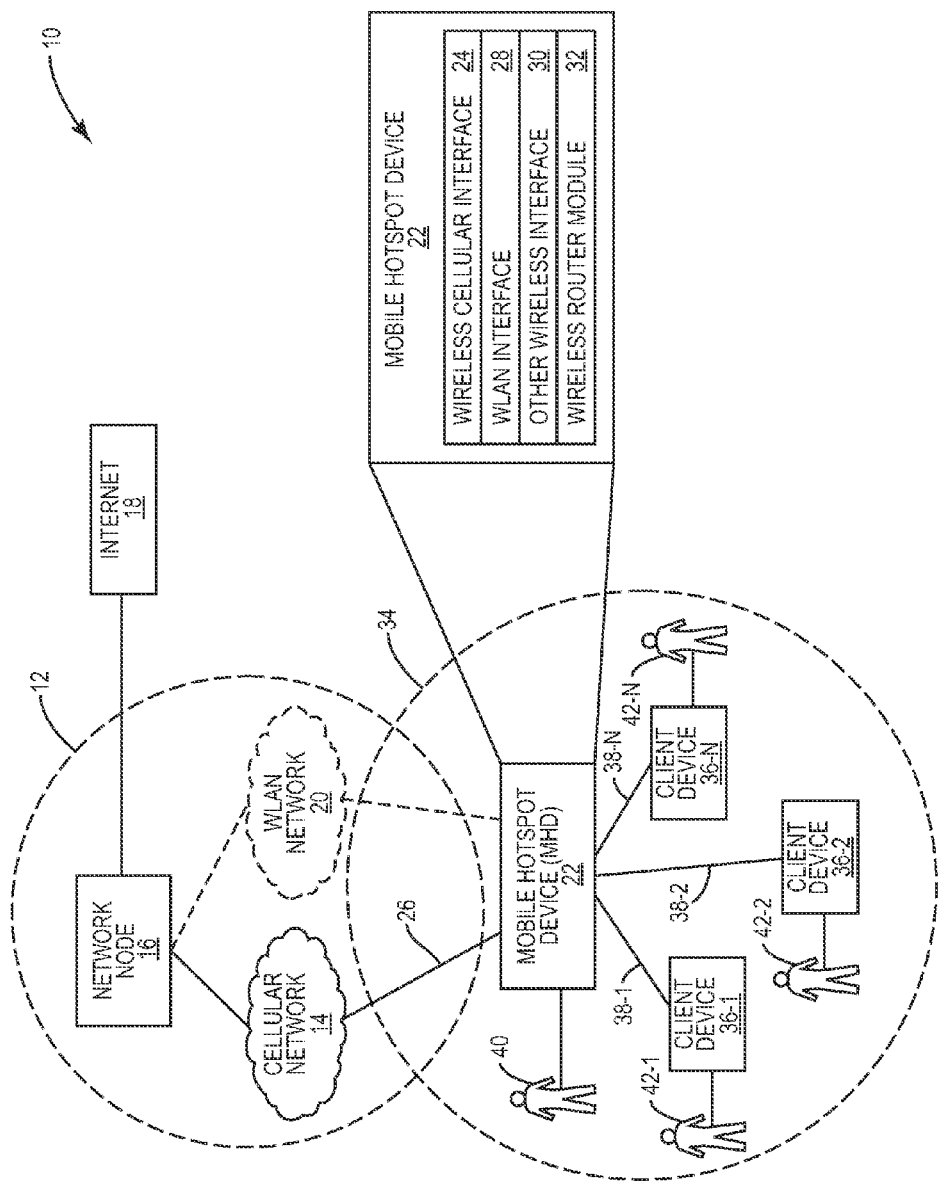
FIG. 1 is a block diagram illustrating a system in which embodiments of the present disclosure may be practiced.

FIG. 1 is a block diagram illustrating a system 10 in which embodiments of the present disclosure may be practiced. The system 10 includes a service provider network 12 that includes a cellular network 14 and one or more network nodes 16. The service provider network 12 is associated with a particular service provider, such as a wireless service provider or the like. The cellular network 14 comprises equipment associated with providing cellular voice and data access to subscriber devices, such as cellular phones, and may comprise, for example, antennas, base stations, base station controllers and the like. The service provider network 12 includes one or more network nodes 16 that comprise computing or processing devices, which, among other functionality that will be discussed in greater detail herein, couples the service provider network 12 with other networks, such as the Internet 18. While for purposes of illustration, the network node 16 is depicted as being separate from the cellular network 14, the network node 16 may be a part of the cellular network 14. Preferably, but not necessarily, the cellular network 14 implements 4G or greater bandwidth through a technology such as WiMax or LTE.

The service provider network 12 may also include one or more WLANs 20 placed at locations such as airports, coffee shops, shopping malls, and the like, which offer access via the service provider network 12 to the Internet 18 to subscribers or transient users.

A mobile hotspot device (MHD) 22 includes a wireless cellular interface 24 that establishes a wireless communications link 26 with the cellular network 14. The wireless cellular interface 24 may comprise any suitable circuitry and/or software necessary to facilitate the establishment of the wireless communications link 26. The wireless communications link 26 is established in accordance with the conventional signaling and connection mechanisms associated with the cellular network 14. The MHD 22 comprises any portable, mobile computing or processing device capable of establishing the wireless communications link 26, such as a smart phone like an Apple® iPhone®, an Android®-based phone, or the like, a laptop computer that includes cellular data interface circuitry, a computer tablet like the Apple® iPad®, Samsung Galaxy®, or the like, or a special purpose hotspot device, such as the Sprint® Overdrive® or the like.

The MHD 22 also includes a WLAN interface 28 suitable for establishing one or more wireless WLAN communication links, such as Wi-Fi™ communication links. The MHD 22 may also have one or more other wireless interfaces 30, such as a ZigBee wireless interface, a Bluetooth® wireless interface, and the like. A wireless router module 32 implements a hotspot capability in the MHD 22. The wireless router module 32 establishes a hotspot 34 via the WLAN interface 28 (or via the other wireless interface 30) such that one or more client devices 36-1-36-N (generally, client devices 36) within the hotspot 34 may connect to the MHD 22 via corresponding wireless communication links 38-1-38-N (generally, wireless communication links 38). The precise boundaries of the hotspot 34 may vary based on any number of factors, including obstructions, the particular wireless technology used, i.e., Wi-Fi, ZigBee, Bluetooth®, etc., interference from other RF emitters, and the like. The wireless router module 32, as described in greater detail herein, routes requests for data from a client device 36 to the network node 16, and routes data from the network node 16 that is destined for client devices 36 to the appropriate client devices 36.

The client devices 36 comprise any computing or processing device that includes a wireless interface capable of establishing a wireless communication link 38 with the MHD 22. For example, the client device 36-1 may comprise a smart phone, such as an Apple® iPhone®, an Android®-based phone, or the like. The client device 36-2 may comprise a laptop computer. The client device 36-N may comprise a computer tablet like the Apple® iPad®, Samsung® Galaxy®, or the like.

In one embodiment, the MHD 22 implements the hotspot 34 via a WLAN having a predetermined service set identifier (SSID) that is associated with the service provider network 12. The MHD periodically beacons, or otherwise broadcasts, the SSID within the hotspot 34. A client device 36, such as the client device 36-1, receives the beacon, and may be programmed or otherwise configured to recognize the predetermined SSID. The client device 36-1 then attempts to connect to the MHD 22 by establishing a respective wireless communications link 38 with the MHD 22. After establishing a wireless communications link 38 with the MHD 22, the client device 36-1 may automatically provide the MHD 22 credentials that identify the client device 36-1. The MHD 22 generates an access request message that includes the credentials and communicates the credentials via the cellular network 14 to the network node 16. The network node 16 receives the access request message and authenticates the client device 36-1 as being authorized to access the service provider network 12 based on the credentials. The network node 16 indicates to the MHD 22 that the client device 36-1 is authorized to access the service provider network 12. Thereafter, with respect to the client device 36-1, the MHD 22 serves primarily as a wireless router that facilitates communications between the client device 36-1 and the service provider network 12.

Via the service provider network 12, the client device 36-1 may access other networks, such as a private network or the Internet 18. Note that in one embodiment the exchange of communications between the client device 36-1, the MHD 22, and the network node 16 happens automatically upon the client device 36-1 detecting the predetermined SSID. This eliminates the need for a user 42-1 to enter usercodes, passwords, and the like. Merely by moving the client device 36-1 within the hotspot 34 the user 42-1 may thereby obtain authenticated access to the Internet 18.

Providing such access to the client device 36-1 may be beneficial to the service provider, an owner 40 of the MHD 22, and the users 42-1-42-N (generally users 42) of the client devices 36. In one embodiment, authorization to access the service provider network 12 may be based, at least in part, on whether a user 42 has a subscription with the service provider. Data consumed by a client device 36 may be counted against a data usage amount associated with the subscription of the respective user 42. This benefits the service provider because it facilitates selling more data to the respective user 42. The ability to access the Internet 18 by the user 42 from locations where the user 42 may not otherwise be able to access the Internet 18 benefits the user 42. The owner 40 of the MHD 22 may also be compensated by the service provider in terms of an increased data usage amount associated with the subscription of the owner 40, a reduced subscription fee, or in other ways.

Figure 2:
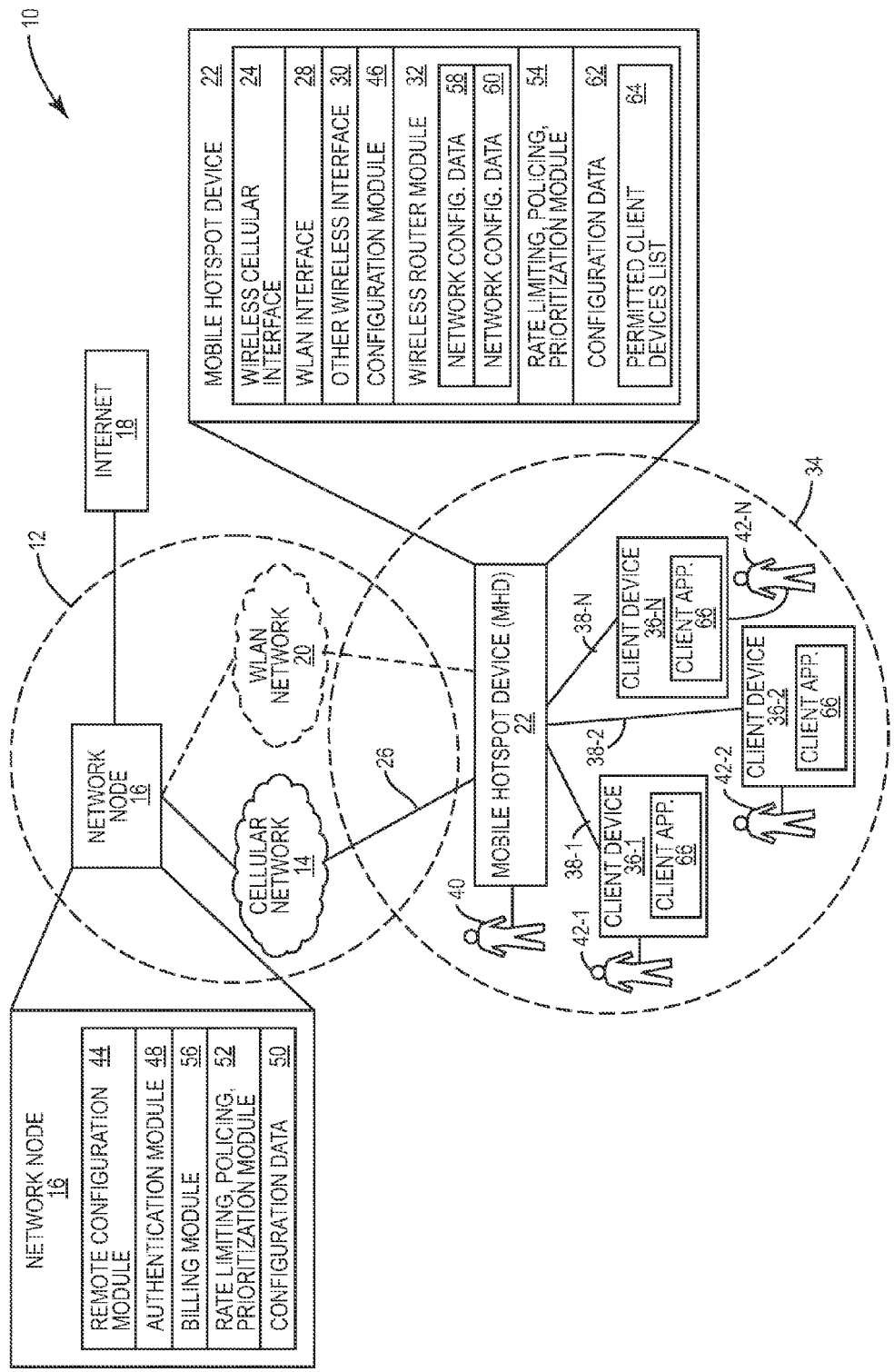
FIG. 2 is a block diagram of the system illustrated in FIG. 1 showing greater detail of certain components.

FIG. 2 is a block diagram of the system 10 illustrated in FIG. 1 showing greater details of some of the components. The network node 16 may include a remote configuration module 44 that interfaces with a configuration module 46 in the MHD 22 to configure the MHD 22 to have a wireless LAN with a predetermined SSID. Such configuration of the MHD 22 may be automatically initiated, for example, after the owner 40 indicates to the service provider that the owner 40 agrees to permit the MHD 22 to serve as a portal via which the client devices 36 can access the service provider network 12. This agreement may be indicated, for example, by accepting the terms of a contract presented on the website of the service provider. The contract may include terms and provisions whereby in return for allowing the MHD 22 to serve as a portal, the owner 40 will be compensated in one or more of the ways discussed above. Such acceptance may trigger the network node 16 to automatically configure the MHD 22 with the predetermined SSID. Such acceptance may also trigger additional software to be loaded onto the MHD 22 by the network node 16 to implement the hotspot functionality, provide desired accounting or prioritization functionality for data destined to the MHD 22 or the client devices 36, or any other desired or appropriate processing to carry out the functionality described herein.

In another embodiment, the owner 40 may configure the MHD 22 to have the wireless LAN with the predetermined SSID based on configuration instructions provided by the service provider during the process of accepting the contract. In one embodiment, the service provider may remotely manage the wireless LAN with the predetermined SSID in the MHD 22, including, for example, managing an encryption type, traffic policing, rate shaping, implementing a quality of service (QOS) policy, remote monitoring, and the like. Remote management may include limiting the number of connections of client devices 36 to the MHD 22. Such remote management may be implemented by any suitable means, including, for example, one or more of SNMP, OMA-DM, TR69, XML, and the like. The network node may also implement a user interface for a service provider operator to remotely manage the MHD 22.

In one embodiment, the network node 16 also includes an authentication module 48 used to authenticate the client device 36 in response to an access request message received from the MHD 22. Such authentication module 48 may access information, such as configuration data 50, to determine whether the credentials included in the access request message identify a known user 42. A rate limiting, policing and prioritization module 52 may, in accordance with rules or criteria identified in the configuration data 50 or received from the MHD 22, limit the rate of certain data flows to the MHD 22 and/or prioritize such data flows. For example, one user 42 may, based on a particular subscription, enjoy a 3 mega-bit per second (mbps) data rate, and another a 1 mbps data rate. Alternately, after a user 42 exceeds the data usage allotment, or threshold, associated with their subscription, additional data may be provided at an increased cost, and/or at a reduced data rate. The MHD 22 may also be able to identify certain client devices 36, such as family members' client devices 36, as having a higher priority, or faster data rates, than any other client devices 36. In another embodiment, the MHD 22 may implement the rate, policing and prioritization function discussed herein in a rate limiting, policing and prioritization module 54 contained in the MHD 22.

A billing module 56 in the network node 16 may, among other features, maintain data usage by various client devices 36 and the MHD 22, and cut-off, or de-authorize, client devices 36 that exceed predetermined data usage allotments associated with respective subscriptions, or ensure that data used in excess of such predetermined data usage allotments are charged at higher incremental rates. The billing module 56 may also allocate certain data usage by client devices 36 to the MHD 22, such as those client devices 36 that are associated with the same subscription as the MHD 22. The billing module 56 may also maintain information suitable for compensating the owner 40 for allowing the MHD 22 to be used as a portal to the service provider network 12.

The wireless router module 32 may maintain data that identifies one or more wireless local area networks that are implemented by the MHD 22. For example, network configuration data 58 may identify a personal Wi-Fi network that has a private SSID that the owner 40 provides to only close friends and family members. Network configuration data 60 may define the Wi-Fi network automatically configured by the remote configuration module 44 that offers a portal to the service provider network 12 for any client devices 36 that detect and identify the predetermined SSID. The network configuration data 60 may be configured with any suitable parameters or attributes associated with a wireless LAN.

SSIDs may also be used by the rate limiting, policing and prioritization module 52 or the rate limiting, policing and prioritization module 54 as the basis for rate limiting and/or prioritization. For example, devices communicatively coupled to the MHD 22 via the private SSID may enjoy higher data rates and/or priority than those communicatively coupled to the predetermined SSID.

In one embodiment, the MHD 22 may also contain configuration data 62 that includes, among other information, a permitted client devices list 64. The permitted client devices list 64 may identify client devices 36 that are permitted by the MHD 22 to access the service provider network 12. Thus, upon receiving a request from a client device 36 to connect to the MHD 22, the MHD 22 may first verify that the client device 36 is identified on the permitted client devices list 64, and if not, refuse to allow the client device 36 to connect to the MHD 22.

The client devices 36 may contain a client application 66 provided by the service provider network 12 that is programmed to detect and identify the predetermined SSID beaconed or otherwise broadcast by an MHD, such as the MHD 22. The predetermined SSID may not be identical across each MHD 22, and the phrase "predetermined SSID" encompasses any naming convention that would permit a client device 36 to detect and identify the SSID as potentially being associated with the service provider. For example, a first portion of the SSID may be generic across all MHDs 22, and a second portion of the SSID may be unique to a particular MHD 22. The client application 66 may parse each available SSID and upon determining that an SSID contains the first generic portion associated with the service provider network 12, attempt to connect to the service provider network 12. The client application 66 may be downloaded from a website offered by the service provider, or may be a part of the initial software package provided on the client device 36 when purchased from the service provider. In another embodiment, the client device 36 may be preconfigured with the SSID of the MHD 22, and may periodically check to determine if it is within range of the MHD 22 by attempting to connect to the MHD 22 via such preconfigured SSID.

Figure 3:
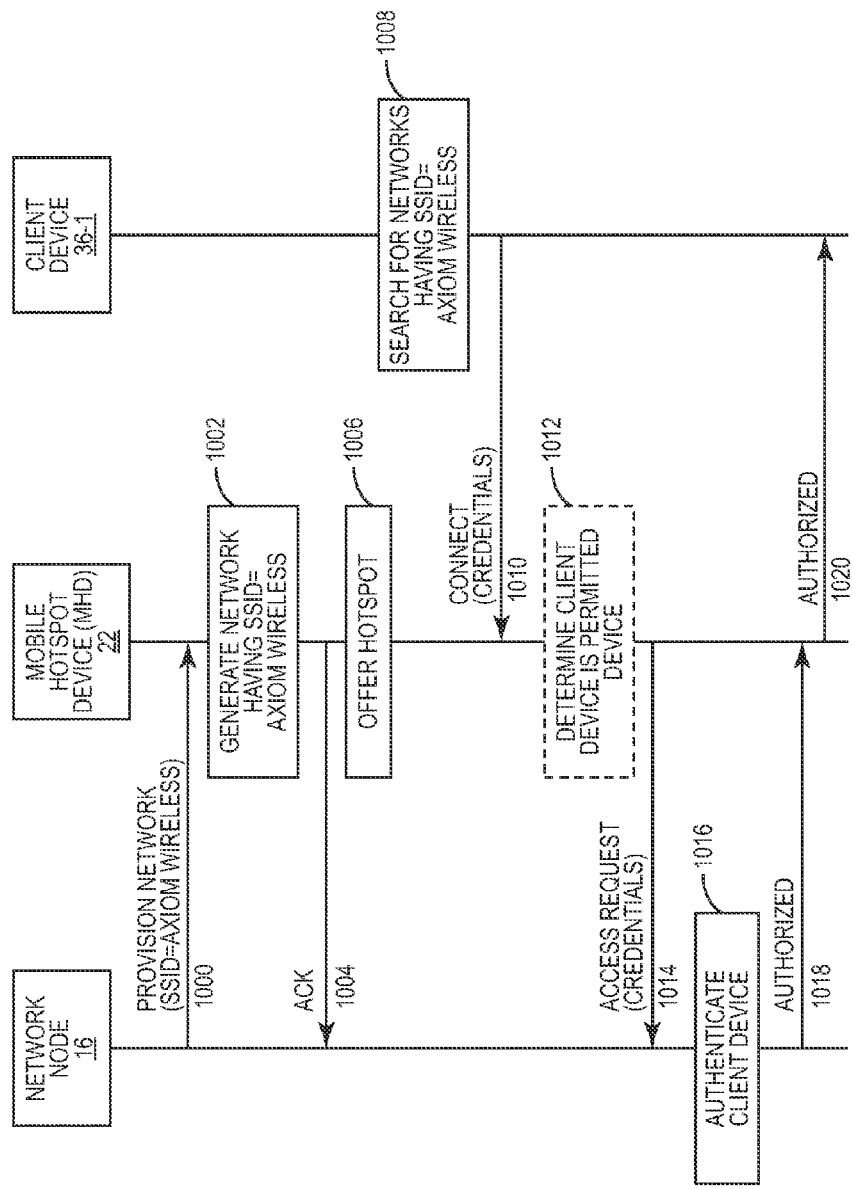
FIG. 3 illustrates an exemplary message flow for facilitating access to a service provider network by a client device via a mobile hotspot device (MHD)

FIG. 3 illustrates an exemplary message flow for facilitating access to the service provider network 12 by a client device 36 via the MHD 22. FIG. 3 will be discussed in conjunction with FIG. 2. Initially, assume that the network node 16 initiates a configuration sequence with the MHD 22 to generate a wireless local area network having a predetermined SSID (FIG. 3, step 1000). The MHD 22 generates the network and acknowledges this to the network node 16 (FIG. 3, steps 1002-1004). The MHD 22 enables the network and thereby offers the hotspot 34 (FIG. 3, step 1006).

The client device 36-1 receives the beacon identifying the hotspot with the predetermined SSID. The client device 36-1 identifies the hotspot as having the predetermined SSID (FIG. 3, step 1008). Because the client device 36-1 recognizes the hotspot 34 as one associated with the service provider network 12, the client device 36-1 establishes a wireless communication link 38-1 with the MHD 22, and provides the MHD 22 credentials for authentication with the service provider network 12 (FIG. 3, step 1010). If the MHD 22 maintains a permitted client devices list 64, the MHD 22 accesses the permitted client devices list 64 to determine whether the client device 36-1 is identified as a permitted device (FIG. 3, step 1012). The MHD 22 then generates and sends an access request message that includes the credentials provided by the client device 36-1 to the network node 16 (FIG. 3, step 1014). The network node 16 determines that the client device 36-1 is authorized to access the service provider network 12 based on the credentials (FIG. 3, step 1016). The network node 16 indicates to the MHD 22 that the client device 36-1 is authenticated, and therefore authorized to access the service provider network 12 through the MHD 22 (FIG. 3, step 1018). The MHD 22 notifies the client device 36-1 that the client device 36-1 is authorized to access the service provider network 12 (FIG. 3, step 1020).

In one embodiment, at some point during the authentication process, the network node 16 may communicate a message to the MHD 22 indicating that the client device 36-1 seeks to access the service provider network 12 through the MHD 22. The MHD 22 may present this to the owner 40, along with options, such as Allow or Reject. If the owner 40 selects the Reject option, the MHD 22 informs the network node 16 that the request has been denied and the network node 16 rejects the access request message. If the owner 40 selects the Allow selection, the network node 16 indicates to the MHD 22 that the client device 36-1 is now permitted to access the service provider network 12. In another embodiment, prior to even sending the access request message to the network node 16, the MHD 22 may identify the client device 36-1 and provide the owner 40 an Allow or Reject option upon receiving the credentials from the client device 36-1.

Figure 4:
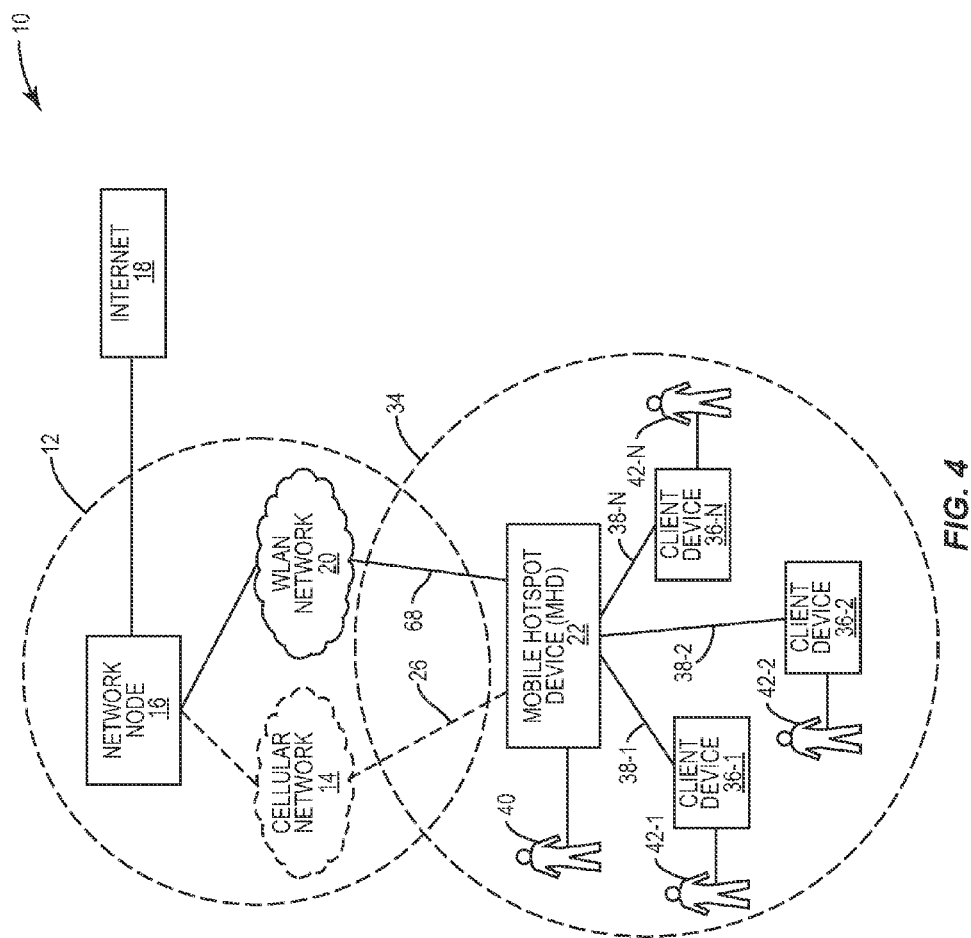
FIG. 4 is a block diagram of the system illustrated in FIG. 1 according to another embodiment.

FIG. 4 is a block diagram of the system illustrated in FIG. 1 according to another embodiment. In this embodiment the MHD 22 detects the presence of the WLAN network 20. The owner 40 or the MHD 22 determines that the WLAN network 20 is associated with the service provider network 12 and that the service provider network 12 is therefore accessible. The MHD 22 establishes a wireless communications link 68 with the WLAN network 20, and communicates with the network node 16 as discussed previously, except through the WLAN network 20 instead of the cellular network 14. Whether the MHD 22 is connected via the WLAN network 20 or the cellular network 14 may be transparent to any client devices 36 that connect to the service provider network 12 via the MHD 22. The MHD 22 may select the WLAN network 20 over the cellular network 14 based on certain criteria, such as a bandwidth of the WLAN network 20 compared to that of the cellular network 14, or may select the WLAN network 20 because of financial criteria, such as the service provider may not charge the MHD 22 for data usage via the WLAN network 20, or may charge at a reduced rate with respect to the cellular network 14.

Figure 5:
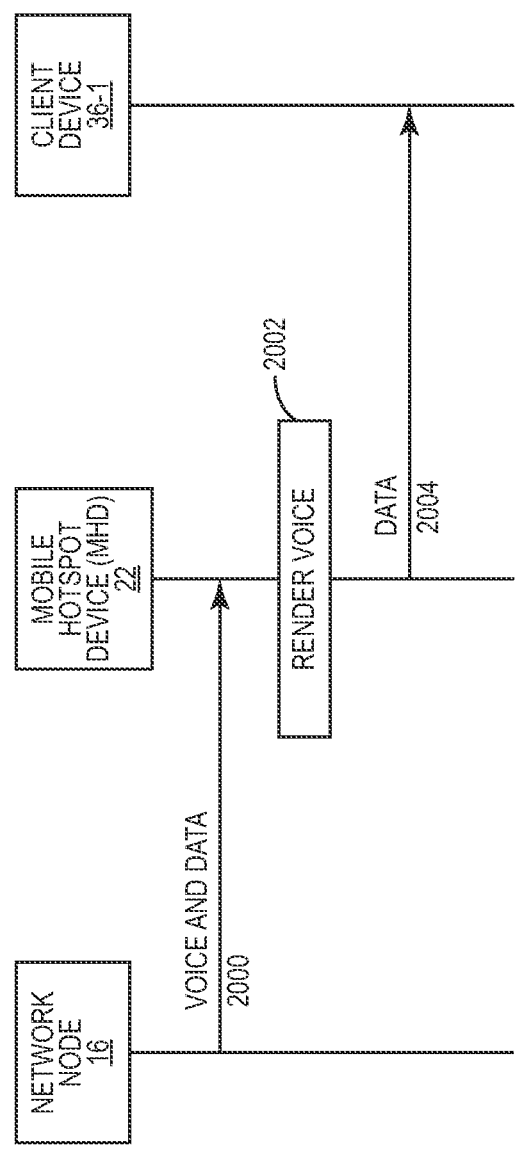
FIG. 5 illustrates an exemplary message flow for providing voice signals and data destined for different devices to the MHD concurrently.

FIG. 5 illustrates an exemplary message flow for providing voice signals and data destined for different devices to the MHD 22 concurrently. Assume that the service provider network 12 has authenticated the client device 36-1 to access the service provider network 12 via the MHD 22. Assume further that the MHD 22 is coupled to the service provider network 12 via the wireless communications link 26 with the cellular network 14. The owner of the MHD 22 is participating in a voice call with another party. Concurrently with the voice call, the client device 36-1 seeks data such as a web page or video from the Internet 18. The network node 16 thus concurrently provides voice signals from the other party to whom the owner 40 is speaking and data destined for the client device 36-1 to the MHD 22 (FIG. 5, step 2000). The MHD 22 renders the voice signals to the owner 40, such as via a speaker contained in the MHD 22 (FIG. 5, step 2002). The MHD 22 also substantially concurrently provides the data that is destined for the client device 36-1 to the client device 36-1. Thus, in the case where the MHD 22 comprises a smart phone, for example, the owner 40 may enjoy cellular voice capabilities while the MHD 22 concurrently serves as a portal to the service provider network 12 for the client device 36-1.

Figure 6:
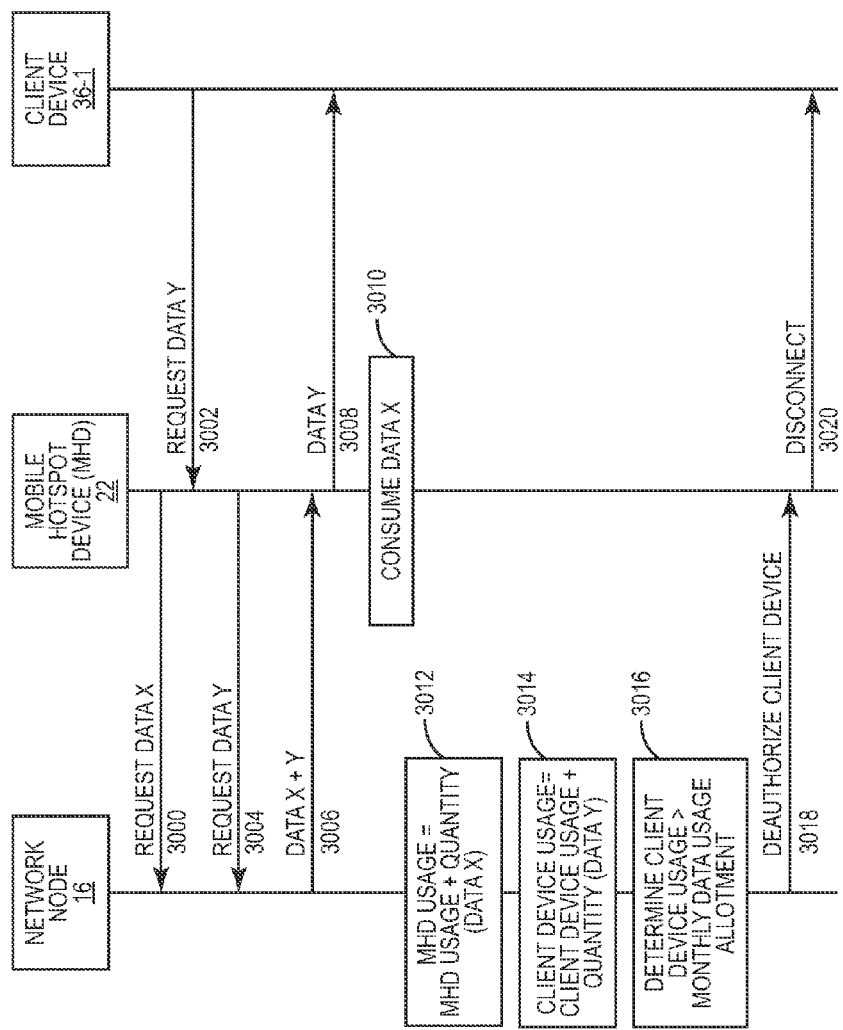
FIG. 6 illustrates an exemplary message flow for accounting for data usage by devices that receive data via the service provider network according to one embodiment.

FIG. 6 illustrates an exemplary message flow for accounting for data usage by devices that receive data via the service provider network 12 according to one embodiment. In this embodiment the owner 40 uses the MHD 22 to access the Internet 18 at substantially the same time the user 42-1 uses the client device 36-1 to access the Internet 18. The MHD 22 generates a request for data X and sends the request to the network node 16 for communication to the Internet 18 (FIG. 6, step 3000). The client device 36-1 substantially concurrently generates a request for data Y and sends the request via the MHD 22 to the network node 16 for communication to the Internet 18 (FIG. 6, steps 3002-3004). The network node 16 receives the requested data from the Internet 18 and provides data X and Y to the MHD 22 (FIG. 6, step 3006). The MHD 22 consumes data X, i.e., presents data X to the owner 40 or otherwise processes data X in accordance with the purposes of requesting data X, and provides data Y, which is destined for the client device 36-1, to the client device 36-1 (FIG. 6, steps 3008-3010).

The network node 16 maintains data usage quantifiers, such as counters, for both the MHD 22 and the client device 36-1 in order to monitor their cumulative data usage in accordance with their respective subscriptions with the service provider. Thus, the network node 16 increases the data usage quantifier of the MHD 22 by the amount of data X (FIG. 6, step 3012). The network node 16 also increases the data usage quantifier of the client device 36-1 by the amount of data Y (FIG. 6, step 3014). The network node 16 determines that the data usage quantifier associated with the client device 36-1 now exceeds the monthly allotment for the client device 36-1 based on the subscription via which the client device 36-1 obtains access to the service provider network 12 (FIG. 6, step 3016). The network node 16 sends a message to the MHD 22 de-authorizing access to the service provider network 12 by the client device 36-1 (FIG. 6, step 3018). The MHD 22 disconnects the client device 36-1 to prevent further access to the service provider network 12 (FIG. 6, step 3020). The MHD 22 may also provide information to the client device 36-1 for display to the user 42-1 explaining the reason the client device 36-1 has been disconnected.

It will be apparent that de-authorizing the client device 36-1 is only one of several different actions that network node 16 may take upon determining that the data usage quantifier associated with the client device 36-1 exceeds the monthly allotment. For example, the network node 16 may simply continue to allow the client device 36-1 to access the service provider network 12 even though the data usage exceeds the monthly allotment because the user 42-1 may be charged for such data at a higher rate than for data under the monthly allotment. The network node 16 may also prioritize data differently based on whether the client device 36 for which the data is destined has exceeded the monthly data usage allotment. In particular, the network node 16 may prioritize data requests from such client devices 36 at a lower priority than data requests from client devices 36 that have not exceeded their monthly data allotments.

In another embodiment, the MHD 22 may track data usage of client devices 36, and provide various actions based on the data usage quantifier associated with a client device 36. For example, if the MHD 22 determines that a particular client device 36 is accessing a significantly higher quantity of data than other client devices 36, the MHD 22 may prioritize other client devices 36 over such client device 36. The MHD 22 may also receive, from the network node 16, the data usage quantifiers associated with the client devices 36, tally the data consumed by the client devices 36, and disconnect or otherwise de-authorize client devices 36 that have exceeded a monthly allotment associated with the respective subscription. Upon disconnect of a client device 36, either voluntarily or involuntarily, the MHD 22 may provide the updated data usage quantifier to the network node 16 for billing and accounting purposes.

Figure 7:
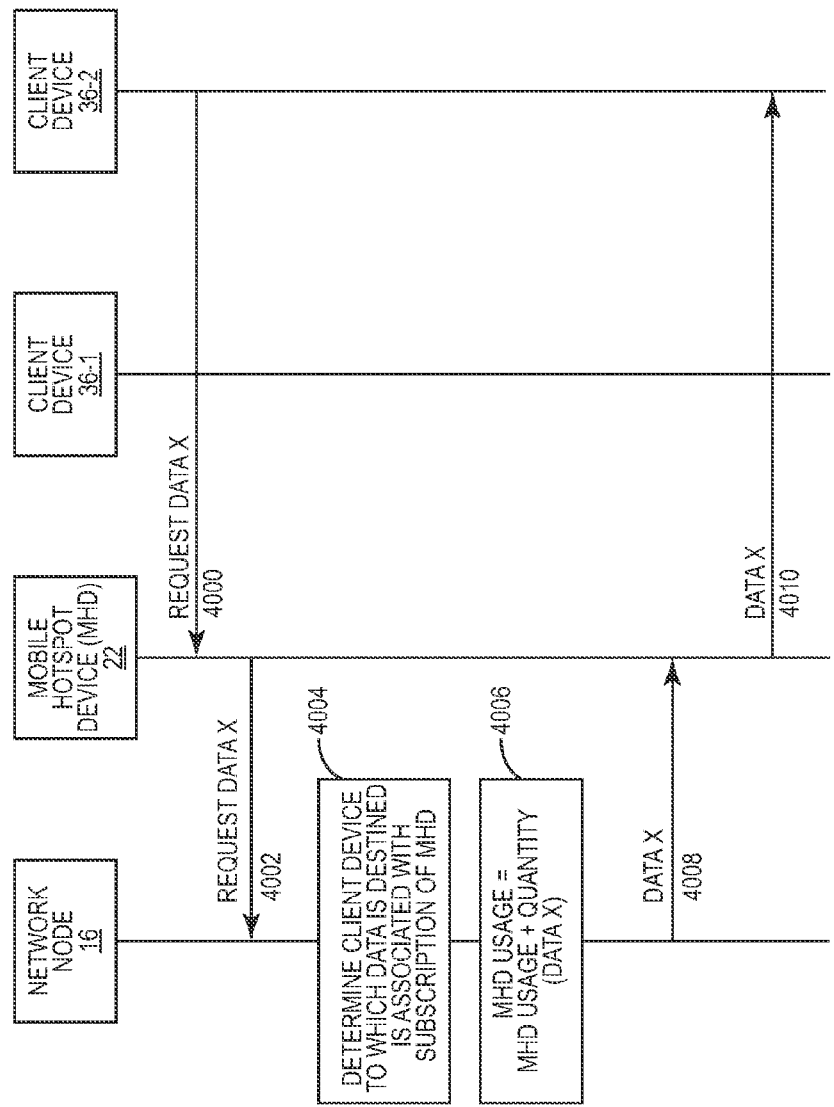
FIG. 7 illustrates another exemplary message flow for accounting for data usage by devices that receive data via the service provider network according to another embodiment.

FIG. 7 illustrates another exemplary message flow for accounting for data usage by devices that receive data via the service provider network 12 according to another embodiment. In this embodiment the client device 36-2 is associated with the subscription of the MHD 22. For example, the client device 36-2 may be identified in the subscription as one of several client devices 36 that are permitted to access the service provider network 12 pursuant to the subscription. The client device 36-2 generates a request for data X and sends the request via the MHD 22 to the network node 16 for communication to the Internet 18 (FIG. 7, steps 4000-4002). The network node 16 receives data X from the Internet 18 and determines that the client device 36-2 is associated with the subscription of the MHD 22 (FIG. 7, step 4004). The network node 16 then adjusts the data usage quantifier associated with the MHD 22 by the quantity of data X (FIG. 7, step 4006). The network node provides data X to the MHD 22 for communication to the client device 36-2 (FIG. 7, steps 4008-4010).

Figure 8:
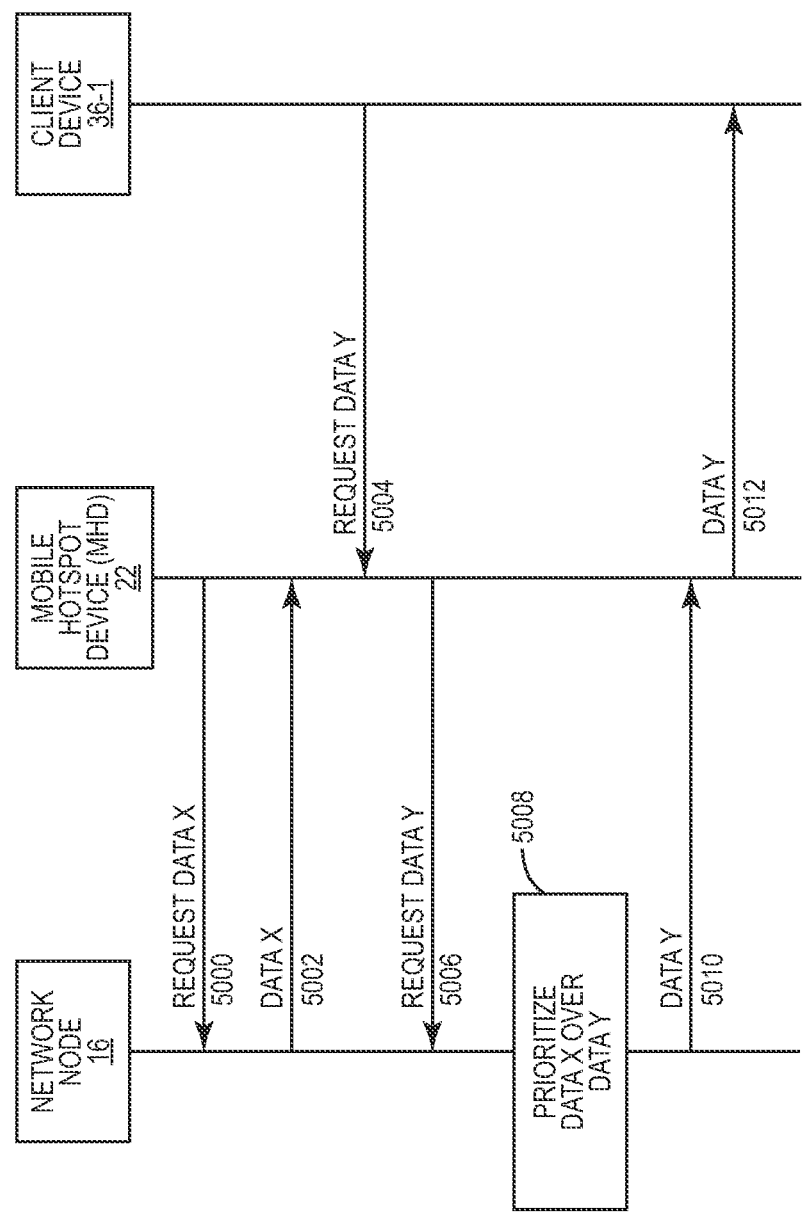
FIG. 8 illustrates an exemplary message flow for prioritizing data provided to one device over data provided to another device according to one embodiment.

FIG. 8 illustrates an exemplary message flow for prioritizing data destined for one device over data destined for another device according to one embodiment. Assume that the owner 40 requests data X, which comprises a first movie stream, from the Internet 18. The network node 16 receives the request from the MHD 22 for data X, and begins providing the first movie stream to the MHD 22 for presentation to the owner 40 (FIG. 8, steps 5000-5002). The user 42-1, while the movie is being streamed to the MHD 22, then requests data Y, which comprises a second movie stream. The client device 36-1 generates a request for data Y and sends it to the network node 16 via the MHD 22 (FIG. 8, steps 5004-5006). The network node 16 receives the request for data Y, and recognizes that data X is destined for the MHD 22, while data Y is destined for the client device 36-1, which is a device other than the MHD 22. The network node 16 prioritizes the data X stream over the data Y stream (FIG. 8, step 5008). Such prioritization can take any of several different forms. In the case of streams of data, such as a movie stream, the network node 16 may allocate a larger bandwidth to the MHD 22 than to the client device 36-1. The reduced bandwidth available to the client device 36-1 may result in a lower resolution movie being provided to the client device 36-1, or may cause less fluid playback of the movie than that enjoyed by the owner 40. The network node 16 then provides the data X and Y to the MHD 22 and client device 36-1, respectively, in accordance with the priority (FIG. 8, steps 5010-5012).

Prioritization may be configured by the owner 40 such that certain client devices 36, such as those associated with the subscription via which the MHD 22 accesses the service provider network 12, have higher priority than any other client devices 36. The owner 40 may indicate that the MHD 22 enjoys a highest priority in any situation. Alternatively, prioritization may be determined by the service provider and may be based on subscription level, subscription status, type of data being requested, or any other criteria.

In one embodiment, the MHD 22 may be able to provide location services for a client device 36 that cannot otherwise provide a location. For example, the MHD 22 may include a GPS receiver that allows the MHD 22 to identify its current location on the earth. If the MHD 22 is connected to a client device 36 via a wireless communication link 38, then the client device 36 is likely within several hundred feet of the MHD 22. If the wireless communication link 38 comprises a Bluetooth® or ZigBee wireless communications link 38, then the client device is likely even closer to the MHD 22. If requested, the MHD 22 may be able to report its own location as the location of the client device 36 and while not exact, may suffice for an emergency situation.

In one embodiment, one MHD 22 may initiate a handoff of a client device 36 to another MHD 22, or to a cellular base station, picocell, femtocell, or the like based on, for example, metrics related to signal performance (e.g., signal strength, throughput capability, latency, congestion), cost (e.g., cost of building and maintaining capacity on the network to which the client device 36 would be transferred), user input (e.g., the owner 40 of the MHD 22 may select to have the client device 36 transfer to another network, or the user 42 of the client device 36 may select to be transferred to another network based on pre-set or dynamically chosen selection criteria), battery life remaining on the MHD 22, or location of the MHD 22 or the client device 36, for example. The handoff may be initiated by the MHD 22 or by the client device 36.

Figure 9:
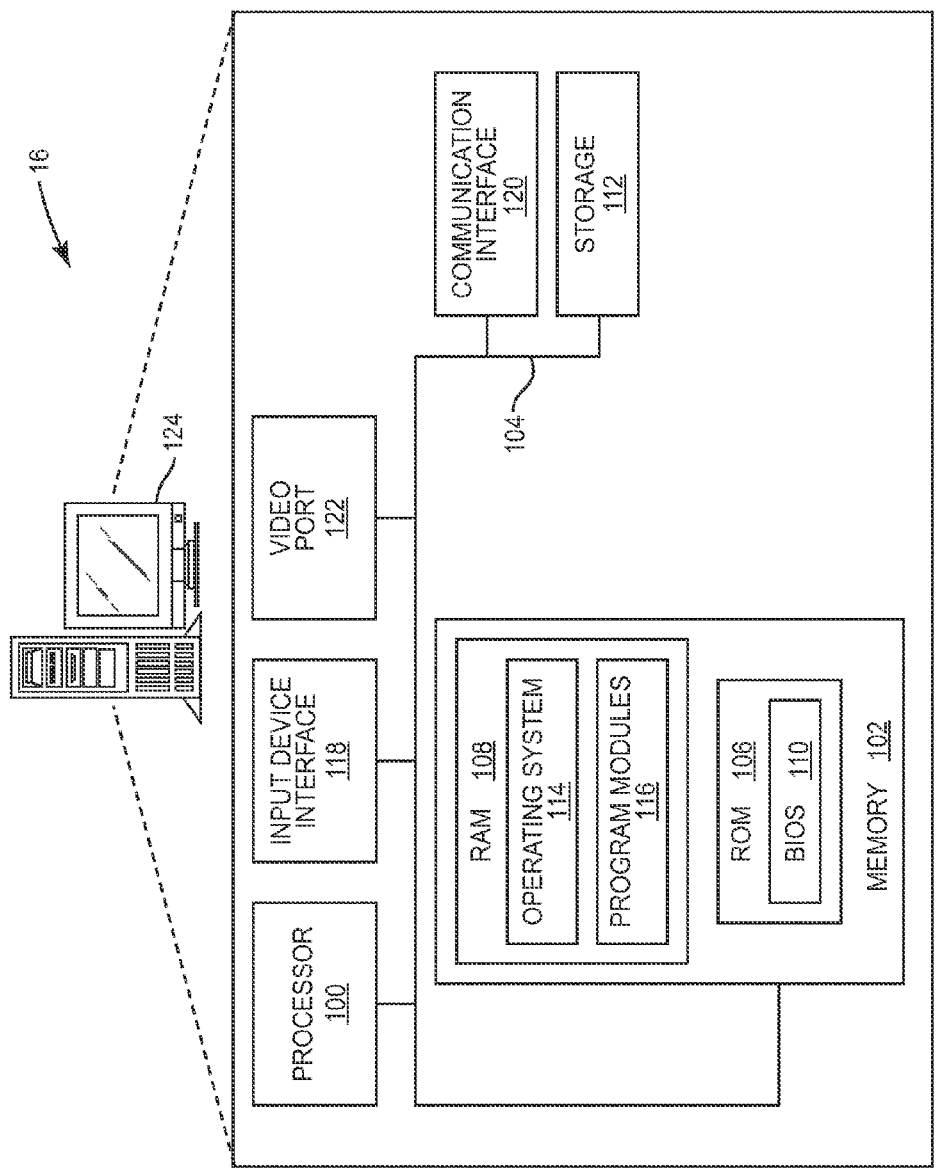
FIG. 9 is a block diagram of an exemplary network node according to one embodiment.

FIG. 9 is a block diagram of a network node 16 according to one embodiment. As discussed previously, the functionality attributed to the network node 16 may be performed by a single processing or computing device, or may be performed by multiple such devices maintained by the service provider. The exemplary network node 16 illustrated in FIG. 9 may comprise a workstation, a telecommunications switch, or the like. The network node 16 includes a processor 100, a system memory 102, and a system bus 104. The system bus 104 provides an interface for system components including, but not limited to, the system memory 102 and the processor 100. The processor 100 can be any of various commercially available or proprietary processors. Dual microprocessors and other multi-processor architectures may also be employed as the processor 100.

The system bus 104 may be any of several types of bus structures that may further interconnect to a memory bus (with or without a memory controller), a peripheral bus, and/or a local bus using any of a variety of commercially available bus architectures. The system memory 102 may include non-volatile memory 106 (e.g., read only memory (ROM), erasable programmable read only memory (EPROM), electrically erasable programmable read only memory (EEPROM), etc.), and/or volatile memory 108 (e.g., random access memory (RAM)). A basic input/output system (BIOS) 110 may be stored in the non-volatile memory 106, and can include the basic routines that help to transfer information between elements within the network node 16. The volatile memory 108 may also include a high-speed RAM such as static RAM for caching data.

The network node 16 may further include the computer-readable storage 112, which may comprise, for example, an internal hard disk drive (HDD) (e.g., enhanced integrated drive electronics (EIDE) or serial advanced technology attachment (SATA)) HDD (e.g., EIDE or SATA) for storage, flash memory, or the like. The storage 112 may store, for example, the configuration data 50, data usage quantifiers, and the like. The drives and associated computer-readable and computer-usable media provide non-volatile storage of data, data structures, computer-executable instructions, and so forth. Although the description of computer-readable media above refers to an HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture.

A number of program modules can be stored in the storage 112 and in the volatile memory 108, including an operating system 114 and one or more program modules 116, which may implement the functionality described herein in whole or in part, including, for example, functionality associated with the remote configuration module 44, the authentication module 48, the billing module 56, the rate limiting, policing, and prioritization module 52, and other processing and functionality described herein. It is to be appreciated that the embodiments can be implemented with various commercially available operating systems 114 or combinations of operating systems 114.

All or a portion of the embodiments may be implemented as a computer program product stored on a transitory or non-transitory computer-usable or computer-readable medium, such as the storage 112, which includes complex programming instructions, such as complex computer-readable program code, configured to cause the processor 100 to carry out the steps described herein. Thus, the computer-readable program code can comprise software instructions for implementing the functionality of the embodiments described herein when executed on the processor 100. The processor 100, in conjunction with the program modules 116 in the volatile memory 108, may serve as a control system for the network node 16 that is configured to, or adapted to, implement the functionality described herein.

An administrator may be able to enter commands and information into the network node 16 through one or more input devices, such as, for example, a keyboard (not illustrated); a pointing device, such as a mouse (not illustrated); or a touch-sensitive surface. Other input devices may include a microphone, an infrared (IR) remote control, a joystick, a game pad, a stylus pen, or the like. These and other input devices may be connected to the processor 100 through an input device interface 118 that is coupled to the system bus 104, but can be connected by other interfaces such as a parallel port, an IEEE 1394 serial port, a Universal Serial Bus (USB) port, an IR interface, etc.

The network node 16 may also include one or more communication interfaces 120 for communicating with, for example, various networks, including the cellular network 14 and the WLAN network 20 discussed herein. The one or more communication interfaces 120 may comprise, for example, wired or wireless network interfaces. The network node 16 may also include a video port 122 that interfaces with a display 124 that provides information to the administrator.

Figure 10:
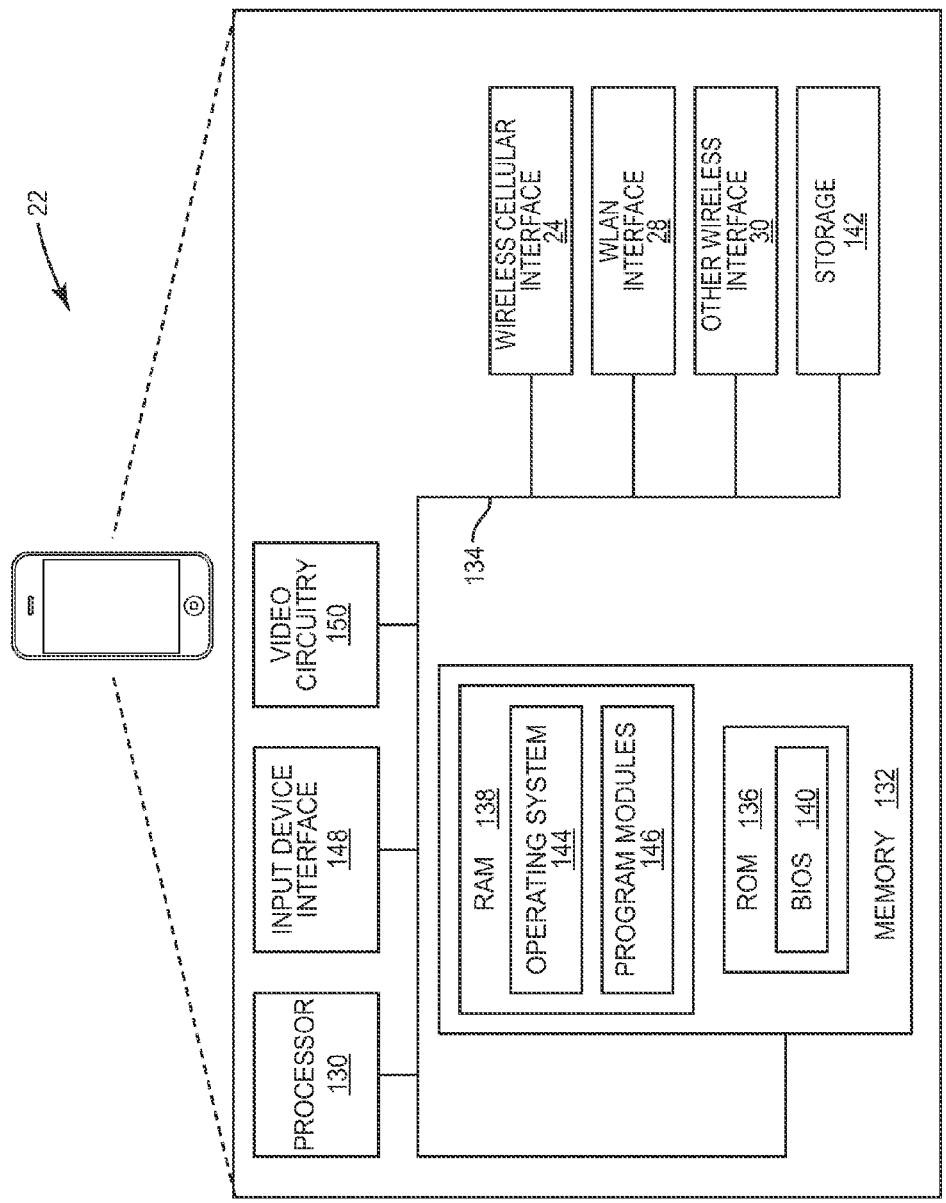
FIG. 10 is a block diagram of an exemplary MHD according to one embodiment.

FIG. 10 is a block diagram of the MHD 22 according to one embodiment. The exemplary MHD 22 illustrated in FIG. 10 may comprise any portable, mobile computing or processing device capable of establishing a wireless communications link, such as a smart phone like an Apple® iPhone®, an Android®-based phone, or the like, a laptop computer that includes cellular data interface circuitry, a computer tablet like the Apple® iPad®, Samsung Galaxy®, or the like, or a special purpose hotspot device, such as the Sprint® Overdrive® or the like. The MHD 22 includes a processor 130, a system memory 132, and a system bus 134. The system bus 134 provides an interface for system components including, but not limited to, the system memory 132 and the processor 130. The processor 130 can be any of various commercially available or proprietary processors. Dual microprocessors and other multi-processor architectures may also be employed as the processor 130.

The system bus 134 may be any of several types of bus structures that may further interconnect to a memory bus (with or without a memory controller), a peripheral bus, and/or a local bus using any of a variety of commercially available bus architectures. The system memory 132 may include non-volatile memory 136 (e.g., read only memory (ROM), erasable programmable read only memory (EPROM), electrically erasable programmable read only memory (EEPROM), etc.) and/or volatile memory 138 (e.g., random access memory (RAM)). A basic input/output system (BIOS) 140 may be stored in the non-volatile memory 136, and can include the basic routines that help to transfer information between elements within the MHD 22. The volatile memory 138 may also include a high-speed RAM such as static RAM for caching data.

The MHD 22 may further include the computer-readable storage 142, which may comprise, for example, an internal hard disk drive (HDD) (e.g., enhanced integrated drive electronics (EIDE) or serial advanced technology attachment (SATA)) HDD (e.g., EIDE or SATA) for storage, flash memory, or the like. The storage 142 may store, for example, the configuration data 62, network configuration data 58, 60, and the like. The drives and associated computer-readable and computer-usable media provide non-volatile storage of data, data structures, computer-executable instructions, and so forth. Although the description of computer-readable media above refers to an HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture.

A number of program modules can be stored in the storage 142 and in the volatile memory 138, including an operating system 144 and one or more program modules 146, which may implement the functionality described herein in whole or in part, including, for example, functionality associated with the configuration module 46, the wireless router module 32, and other processing and functionality described herein. It is to be appreciated that the embodiments can be implemented with various commercially available operating systems 144 or combinations of operating systems 144.

All or a portion of the embodiments may be implemented as a computer program product stored on a transitory or non-transitory computer-usable or computer-readable medium, such as the storage 142, which includes complex programming instructions, such as complex computer-readable program code, configured to cause the processor 130 to carry out the steps described herein. Thus, the computer-readable program code can comprise software instructions for implementing the functionality of the embodiments described herein when executed on the processor 130. The processor 130, in conjunction with the program modules 146 in the volatile memory 138, may serve as a control system for the MHD 22 that is configured to, or adapted to, implement the functionality described herein.

A user, such as the owner 40, may be able to enter commands and information into the MHD 22 through one or more input devices, such as, for example, a keyboard (not illustrated); a pointing device, such as a mouse (not illustrated); or a touch-sensitive surface. Other input devices may include a microphone, an infrared (IR) remote control, a joystick, a game pad, a stylus pen, or the like. These and other input devices may be connected to the processor 130 through an input device interface 148 that is coupled to the system bus 134, but can be connected by other interfaces such as a parallel port, an IEEE 1394 serial port, a Universal Serial Bus (USB) port, an IR interface, etc.

The MHD 22 may also include the wireless cellular interface 24 suitable for establishing a wireless communications link 26 with a cellular network, such as the cellular network 14. The MHD 22 may include the WLAN interface 28 suitable for establishing a wireless communications link 68 with a WLAN network, such as the WLAN network 20. The MHD 22 may include one or more other wireless interfaces 30 suitable for establishing other wireless communications links, such as ZigBee wireless communications links and Bluetooth® wireless communications links. The MHD 22 may also include video circuitry 150 that interfaces with a display 152 that provides information to the owner 40.

Those skilled in the art will recognize improvements and modifications to the preferred embodiments of the present disclosure. All such improvements and modifications are considered within the scope of the concepts disclosed herein and the claims that follow.

What is claimed is:

1. A method for providing access to a service provider network associated with a service provider and comprising at least one network node, comprising:

establishing, by the at least one network node, a first wireless communication link with a mobile hotspot device associated with a first subscriber of the service provider, the mobile hotspot device configured to establish a second wireless communication link with at least one client device;

receiving, by the at least one network node, an access request message from the mobile hotspot device, the access request message comprising credentials provided by the at least one client device;

determining, by the at least one network node, that the at least one client device is a second subscriber of the service provider based on the credentials;

indicating to the mobile hotspot device that the at least one client device is authorized to access the service provider network through the mobile hotspot device;

increasing a first subscriber data usage counter associated with the first subscriber based on data sent to the mobile hotspot device that is destined for the mobile hotspot device; and increasing a second subscriber data usage counter associated with the second subscriber based on data sent to the mobile hotspot device that is destined for the at least one client device.

2. The method of claim 1, wherein the mobile hotspot device comprises a cellular phone of a subscriber of the service provider.

3. The method of claim 1, further comprising:
providing voice signals destined for the mobile hotspot device to the mobile hotspot device via the first wireless communication link while concurrently providing data destined for the at least one client device to the mobile hotspot device via the first wireless data communication link.

4. The method of claim 1, further comprising:
provisioning, by the at least one network node, the mobile hotspot device with a wireless network having a predetermined SSID; and
wherein the at least one client device seeks access to the mobile hotspot device in response to detecting the predetermined SSID.

5. The method of claim 1, further comprising:
making a determination that the second subscriber data usage counter exceeds a predetermined threshold; and
based on the determination, de-authorizing access of the at least one client device to the service provider network.

6. The method of claim 1, further comprising:
providing a message to the mobile hotspot device for presentation to a user of the mobile hotspot device that the at least one client device has requested access to the service provider network through the mobile hotspot device.

7. The method of claim 1, further comprising:
determining a quantity of data provided to the mobile hotspot device that is destined for the at least one client device; and
based on the quantity of data, reducing a fee associated with a subscription by which the first subscriber accesses the service provider network.

8. The method of claim 1, further comprising:
determining a quantity of data provided to the mobile hotspot device that is destined for the at least one client device; and
based on the quantity of data, increasing a data usage allotment associated with the first subscriber.

9. A network node, comprising:
a communication interface configured to communicate with a service provider network; and
a processor coupled to the communication interface and configured to:
establish a first wireless communication link with a mobile hotspot device associated with a first subscriber of a service provider, the mobile hotspot device configured to establish a second wireless communication link with at least one client device;
receive an access request message from the mobile hotspot device, the access request message comprising credentials provided by the at least one client device;
determine that the at least one client device is a second subscriber of the service provider based on the credentials;
indicate to the mobile hotspot device that the at least one client device is authorized to access the service provider network through the mobile hotspot device;
increase a first subscriber data usage counter associated with the first subscriber based on data sent to the mobile hotspot device that is destined for the mobile hotspot device; and
increase a second subscriber data usage counter associated with the second subscriber based on data sent to the mobile hotspot device that is destined for the at least one client device.

10. The network node of claim 9, wherein the mobile hotspot device comprises a cellular phone of a subscriber of the service provider.

11. The network node of claim 9, wherein the processor is further configured to:
provide voice signals destined for the mobile hotspot device to the mobile hotspot device via the first wireless communication link while concurrently providing data destined for the at least one client device to the mobile hotspot device via the first wireless communication link.

12. The network node of claim 9, wherein the processor is further configured to:
provision the mobile hotspot device with a wireless network having a predetermined SSID; and
wherein the at least one client device seeks access to the mobile hotspot device in response to detecting the predetermined SSID.

13. The network node of claim 9, wherein the processor is further configured to:
make a determination that the second subscriber data usage counter exceeds a predetermined threshold; and
based on the determination, de-authorize access of the at least one client device to the service provider network.

14. The network node of claim 9, wherein the processor is further configured to:
provide a message to the mobile hotspot device for presentation to a user of the mobile hotspot device that the at least one client device has requested access to the service provider network through the mobile hotspot device.

15. The network node of claim 9, wherein the processor is further configured to:
determine a quantity of data provided to the mobile hotspot device that is destined for the at least one client device; and
based on the quantity of data, reduce a fee associated with a subscription by which the first subscriber accesses the service provider network.

16. The network node of claim 9, wherein the processor is further configured to:

determine a quantity of data provided to the mobile hotspot device that is destined for the at least one client device; and based on the quantity of data, increase a data usage allotment associated with the first subscriber.

17. A mobile hotspot device, comprising:

at least one wireless interface configured to establish a first wireless communication link and a second wireless communication link;

a processor coupled to the at least one wireless interface and configured to:

communicate with a service provider network via the first wireless communication link;

communicate with a client device via the second wireless communication link;

receive a request from the client device to access the service provider network;

submit the request, including credentials associated with the client device, to the service provider network;

receive authorization from the service provider network that the client device is authorized to access the service provider network;

receive a first request for first data from the client device;

receive a second request for second data from a user of the mobile hotspot device;

prioritize servicing the second request over the first request;

access a predetermined data usage threshold associated with the client device;

make a determination that a quantity of data delivered to the client device via the mobile hotspot device has exceeded the predetermined data usage threshold; and in response to the determination, de-authorize access of the client device to the service provider network.

\* \* \* \* \*